J. JACKSON.
COMBINED BELT LINK AND KEY RING HOLDER.
APPLICATION FILED JAN. 3, 1921. RENEWED OCT. 24, 1921.

1,417,996.

Patented May 30, 1922.

INVENTOR.
JOHN JACKSON
BY
*Mason Fenwick & Lawrence*
ATTORNEYS.

UNITED STATES PATENT OFFICE.

JOHN JACKSON, OF ST. LOUIS, MISSOURI.

COMBINED BELT LINK AND KEY-RING HOLDER.

1,417,996.     Specification of Letters Patent.     Patented May 30, 1922.

Application filed January 3, 1921, Serial No. 434,690. Renewed October 24, 1921. Serial No. 510,104.

*To all whom it may concern:*

Be it known that I, JOHN JACKSON, a citizen of the United States, residing at St. Louis, in the county of St. Louis and State of Missouri, have invented certain new and useful Improvements in Combined Belt Links and Key-Ring Holders; and I do hereby declare the following to be a full, clear, and exact description of the invention, such as will enable others skilled in the art to which it appertains to make and use the same.

This invention relates to a key ring attachment and more particularly to a link structure for an expansible belt adapted to serve as a key ring attachment.

The object of the invention is to provide a simple and efficient device lending itself to integral construction with an expansible link belt.

The invention consists in the novel structure, arrangement and combination of parts hereinafter more particularly described and claimed.

One sheet of drawings accompanies this specification as part thereof in which like reference characters indicate like parts throughout.

Figure 1:
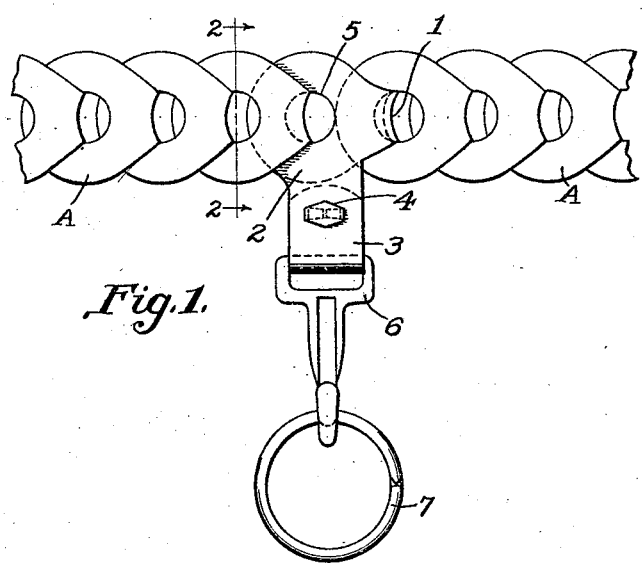
Fig. 1 is a side view of a part of a belt showing the key ring link in place.
Figure 2:
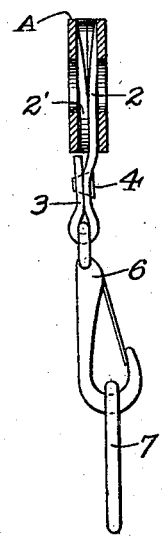
Fig. 2 is a section taken on line 2—2 of Fig. 1.

Referring to the drawings, A represents a belt formed of a plurality of links in the well-known manner in which a plurality of links each having two perforations are secured together by doubling one to bring its perforations into alignment, drawing a second link through the perforations of the first and then doubling it in the same manner and continuing to any length desired.

Figure 3:
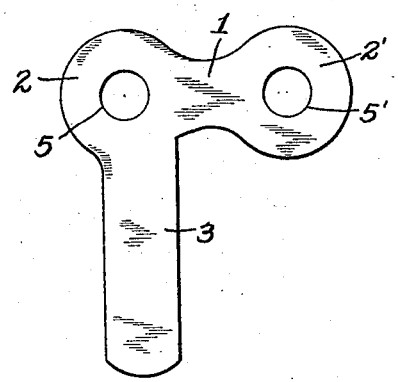
Fig. 3 is a plan view of the improved key ring link.

For use in such a belt construction it is proposed to make a link comprising a flat body 1, preferably of leather having rounded ends 2—2′ each end provided with a centrally located hole 5—5′. An extension 3 integral with the link member is provided adjacent the end 2 lying perpendicular to the long axis of the link as illustrated in Fig. 3.

The end 2′ of this special link is adapted to be drawn through the perforations of an ordinary link at any desired point in the belt structure and bent back on end 2 so that perforations 5—5′ coincide and another ordinary link is then passed through its perforations and the belt structure continued as desired.

The extension 3 is adapted to be passed through the loop of any suitable type of fastener—a snap fastener 6, as illustrated is preferred, then bent back on itself and fastened as by rivet 4. A key ring can readily be snapped onto the fastener and removed as desired.

Having thus described my invention, I claim:

1. A combined belt link and key ring holder comprising a body having rounded ends and an orifice adjacent each end, said member bent upon itself so that said orifices are superposed and engaged by an adjacent link and an extension located adjacent one end and adapted to be bent and secured upon itself to hold a fastener member.

2. A combined belt link and key ring holder comprising a flat body having rounded ends and an orifice located centrally of each end part and bent upon itself so that said orifices are superposed and engaged by an adjacent link, an extension located adjacent one end and adapted to be passed through a fastener and bent back and secured upon itself.

3. A combined belt link and key ring holder comprising a flat link member having enlarged and rounded ends each provided with a centrally located orifice and a lateral extension integral with one end of said link member, said link member being adapted to be bent medially so that its enlarged ends with their orifices are superposed and engaged by an adjacent link and said lateral extension adapted to be bent and secured upon itself about a snap.

In testimony whereof I affix my signature.

JOHN JACKSON.